United States Patent

[11] 3,582,687

[72] Inventor Antonio F. Bellomo
Cambridge, Mass.
[21] Appl. No. 841,791
[22] Filed July 15, 1969
[45] Patented June 1, 1971
[73] Assignee Massachusetts Institute of Technology
Cambridge, Mass.

[54] MONOSTABLE AND ASTABLE MULTIVIBRATOR APPARATUS INCLUDING DIFFERENTIAL AMPLIFIER, RC NETWORK AND SWITCH MEANS FOR INITIATING AND TERMINATING OUTPUT PULSES
10 Claims, 9 Drawing Figs.

[52] U.S. Cl. .......... 307/273, 307/279, 328/207, 331/113
[51] Int. Cl. .......... H03k 3/10, H03k 3/26
[50] Field of Search .......... 307/273, 279; 328/207; 330/30 D; 331/113

[56] References Cited
UNITED STATES PATENTS
3,441,872 4/1969 Wagener et al. .......... 307/273

OTHER REFERENCES
Pub I "Stable High Efficiency Single-shot Circuit" by Roghr, Jr. et al., in IBM Tech. Disclosure Bulletin Vol. 11, No. 4, dated Sept. 1968, Pages 352— 353

*Primary Examiner*—Stanley D. Miller, Jr
*Attorneys*—Thomas Cooch, Martin M. Santa and Robert Shaw

ABSTRACT: Monostable multivibrator apparatus (one shot) is disclosed which was conceived to fill the need for a reliable, stable, low-power pulse generator that is not sensitive to temperature and supply-voltage variations. In one embodiment, two of the monostable multivibrators are connected in a closed-loop configuration for use as an astable low frequency clock generator. To provide stability the monostable includes a differential amplifier having one input connected to a reference input voltage (midpoint of a resistance voltage divider), the other input receiving a pulse-width determining voltage from a capacitance-resistance network. Switch means, which functions to initiate and terminate output pulses, is activated by an external signal to initiate pulses and by the output of the differential amplifier to terminate pulses.

INVENTOR
ANTONIO F. BELLOMO
BY
ATTORNEY

INVENTOR
ANTONIO F. BELLOMO
BY Robert Shaw
ATTORNEY

INVENTOR
ANTONIO F. BELLOMO
BY Robert Shaw
ATTORNEY

INVENTOR
ANTONIO F. BELLOMO
BY [signature]
ATTORNEY

MONOSTABLE AND ASTABLE MULTIVIBRATOR APPARATUS INCLUDING DIFFERENTIAL AMPLIFIER, RC NETWORK AND SWITCH MEANS FOR INITIATING AND TERMINATING OUTPUT PULSES

The invention described herein was made in the performance of work under a National Aeronautics and Space Administration contract and is subject to the provisions of Section 305 of the National Aeronautics and Space Act of 1958, Public Law 85-568 (72 Stat. 435; 42 U.S.C. 4257).

The present invention relates to monostable multivibrator apparatus to provide low-power pulses and to apparatus in which two such multivibrators are connected in a closed-loop configuration to provide a stable clock generator.

Monostable multivibrator devices of the type herein described find application in digital systems which require high speed and low power consumption, but which require, as well, stability of output signal irrespective of environmental changes in temperature and changes in supply voltage to the device. One difficulty encountered in such monostable devices is the occurrence of variations in pulse width because of changes in temperature and/or supply voltage. Accordingly, an object of the invention is to provide a reliable, stable, low-power monostable pulse generator that is relatively independent of environmental temperature and of supply voltage, and to do so without employing cumbersome, difficult and often expensive compensation techniques.

Another object is to provide a monostable pulse generator that can be made using monolithic integrated circuit techniques, and which can employ both junction transistors and field effect transistors such as, for example, metal oxide field effect transistors (MOSFETS).

In such devices it is important, as mentioned, to furnish stable pulse width, but it is important as well to provide easy adjustability of pulse width to a desired value. Still another object, therefore, is to provide a monostable multivibrator in which pulses issuing therefrom can be varied in a predetermined exact manner and with facility.

A further object is to provide such a multivibrator having output pulses of very short rise and fall times, of the order of nanoseconds.

A still further object is to provide a monostable multivibrator having a high duty cycle, of the order of 98 percent.

A still further object is to supply a monostable multivibrator having a self-locking mode of operation to provide noise immunity.

Another object is to provide an astable multivibrator apparatus comprising two of the before-mentioned monostable multivibrators in a closed-loop configuration.

These and other objects are discussed in the description to follow and are particularly delineated in the appended claims.

The objects of the invention are attained in a monostable multivibrator including, in combination, a differential amplifier, a capacitance-resistance network connected to one input of the differential amplifier, and a voltage divider connected to the other input of the differential amplifier. A voltage source is connected across the voltage divider and across the resistance-capacitance network. A normally closed switch is connected across the capacitance to bypass the same when the switch is in the closed condition, and a normally open switch, adapted to close when the normally closed switch is opened, is connected to provide an output from the monostable multivibrator.

The invention will be described with reference to the accompanying drawings in which.

Figure 1:
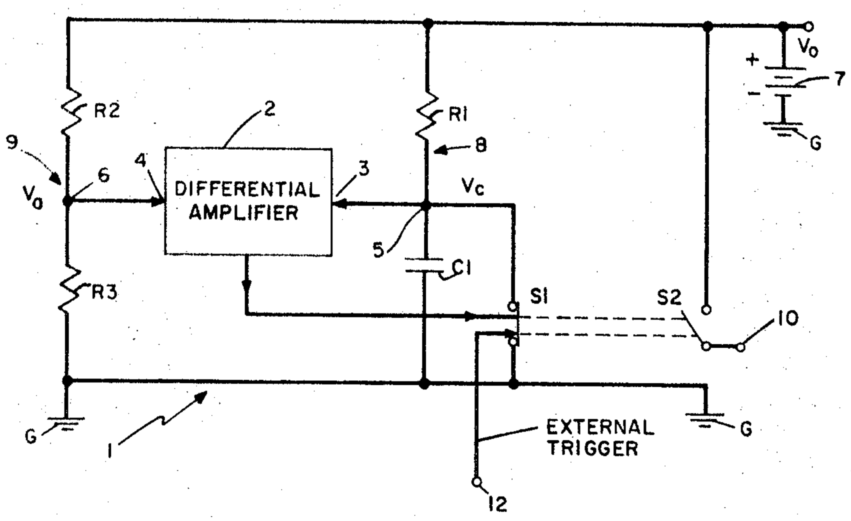
FIG. 1 is a schematic circuit diagram, partially in block diagram form, of a monostable multivibrator embodying the present inventive concept.

Referring now to FIG. 1 a monostable multivibrator embodying the teachings of the invention is shown generally at 1. A differential amplifier 2 is connected at one input 3 thereof to the common connection or junction 5 of a capacitance-resistance network 8 consisting of a resistance R1 and a capacitance C1. The midpoint, labeled 6, of a voltage divider 9, comprising thermally matched resistance R2 and R3, is connected to the other input, shown at 4, of the differential amplifier. A potential source 7 is connected to impress a voltage $v_o$ across the voltage divider 9 and across the resistance-capacitance network 8 in parallel therewith. The input 4 thus receives a reference voltage designated $v_a$ herein from the divider and the input 3 receives a voltage $v_c$ which will be shown in later paragraphs herein to be the determinant of pulse width (also called p.w. herein) of output pulses derived from the multivibrator in the manner now explained.

At time just prior to $T=0$, a normally closed switch S1 is in the closed condition bypassing or shorting the capacitance C1 and, thus, assuring a zero voltage condition across the capacitance. At $T=0$ the switch S1 is opened and a normally open switch S2 is closed, the switch S2 being connected to provide an output at terminal 10 from the multivibrator, and the leading edge of an output pulse appears at the output terminal 10. When the switch S1 is open, the capacitance C1 begins to charge through the resistance R1 toward the voltage $v_o$. When the voltage $v_c$ equals the reference voltage $v_a$ (at time $T_1$), the switch S1 closes and the switch S2 opens, thereby terminating the output pulse from the multivibrator. Any offset or drift in the differential amplifier 2 due to temperature sensitivity thereof would affect pulsed width; however, currently available integrated amplifiers, which is the type of amplifier contemplated for the present device, have combined offset and drift of typically 2.55 $\mu$ volts/° C. so that such effects are negligible. The pulse width stability, then, depends only upon the passive components R1, R2, R3 and C1. The resistances R2 and R3 need not necessarily be unchanging with variable temperature but need only thermally track. The stability depends primarily upon the adjustment components R1 and C1 for which components are readily available to provide pulse width stabilities of a few parts per million per ° C. The elements R2 and R3 and the elements R1 and C1 must also be thermally closely coupled.

As to instabilities that might occur because of changes in the input voltage $v_o$, since $v_o$ provides both the reference voltage $v_a$ and the input voltage $v_c$ to the capacitance in the present apparatus, any variation in $v_o$ will cancel and will not affect the pulse width. That the pulse width is not affected by changes in ambient temperature and source voltage is shown in the following relationships:

$$v_a = v_o \left( \frac{R3}{R2+R3} \right) \qquad \text{(a)}$$

$$[v_c]_{t=T_1} = v_a = v_o (1 - e^{-T_1/R1 \cdot C1}) \qquad \text{(b)}$$

and $$\text{p.w.} = T_1 = R1 \cdot Cl \cdot \ln \left( \frac{R2+R3}{R2} \right) \qquad \text{(c)}$$

where $R1 \cdot C1$ is the time constant for the network 8 and $t$ is time and 1$n$ is the natural log.

Figure 2:
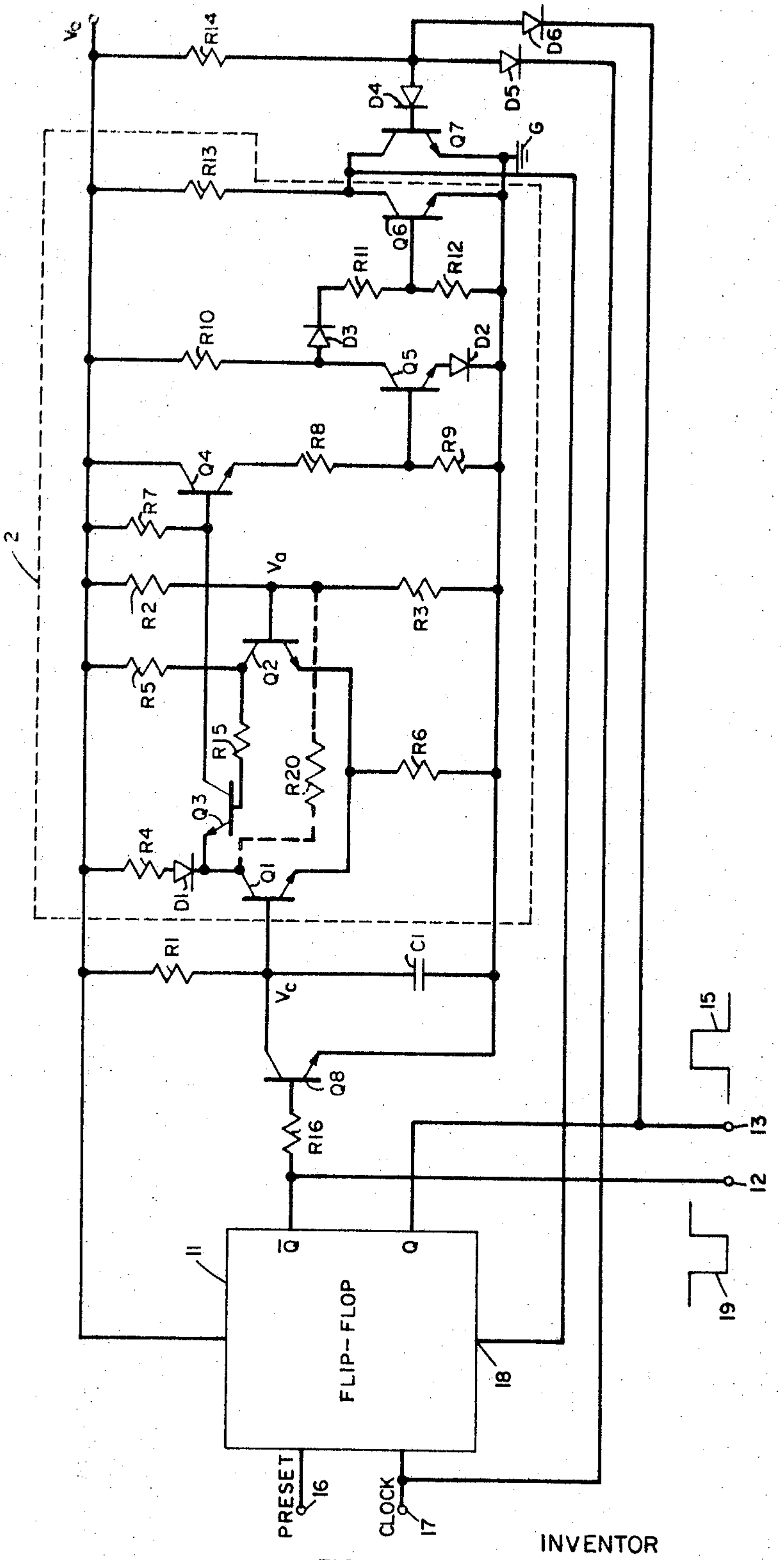
FIG. 2 is a schematic circuit diagram of a practical embodiment of the apparatus shown in FIG. 1 and illustrates a circuit employing junction transistors.

The differential amplifier 2 is shown in FIG. 2 comprising input stage transistors Q1 and Q2 which for proper operation have matched $V_{be}$ and current gain over the full temperature range of contemplated operation. The collectors of the transistors Q1 and Q2 are connected to $v_o$ through collector load resistances R4 and R5, respectively, that must be matched in temperature coefficient, and a diode D1 serves to decrease the differential in threshold voltage, $\Delta V = v_c - v$, at the end of the pulse. The resistance designated R6 is a current-setting resistor and functions as a current source to the differential amplifier. The transistors labeled Q3, Q4 and Q5 are interstage transistor amplifiers, a transistor Q6 is the output transistor for the differential amplifier, and a transistor Q7 is used in a retriggerable mode, as later mentioned, to reset a flip-flop 11 at the rising edge of the trigger pulse. The diode D1, in addition to the mentioned function, serves also as a means of some compensation for the $\Delta V_{be}$ of Q3 with temperature, and further diodes D2, D3 and D4 are biasing elements. The diode D1 can be replaced by a base-emitter junction for better matching to $V_{be}$ of Q3 over a wide temperature range. A pair of diodes D5 and D6 are coupling elements and perform the "AND" logic function mentioned hereinafter. Resistances R7, R10 and R13 are collector load resistors for the transistors Q3, Q5 and Q6, respectively; resistances R14 and R15 are biasing resistors for transistors Q7 and Q3, respectively; resistances R8 and R9 are biasing resistances for the transistor Q5; and resistances R11 and R12 are biasing resistors for the transistor Q6.

The function of the switch S1 in FIG. 1 is performed in the apparatus illustrated in FIG. 2 by a transistor Q8 which is controlled by the $\overline{Q}$ output of the flip-flop 11, which is fed through a resistance R16 to the base of the transistor Q8. The function of the switch S2 is performed by transistors Q17 and Q18, a diode D16 and a resistance R32 in the flip-flop 11 connected between $v_o$ and ground G in FIG. 7 and acting in combination to perform the switch function, the output Q being shorted to ground G when the transistor Q18 is in the conducting state and Q17 is not conducting and being about equal to $v_o$ less the drop across R32 when Q17 is conducting and Q18 is nonconducting. A similar arrangement is provided for the output $\overline{Q}$ which, in addition to providing switching pulses for Q8, also supplies a pulse 19 at an output terminal 12 which is complementary to a pulse 15 at an output terminal 13, the function of the switch connected to provide a pulse to the terminal 12 being performed by transistors Q9 and Q10, a diode D8 and a resistance R21. The complementary switching provided by Q17—Q18 and Q9—Q10 to the outputs 12 and 13, respectively, makes possible output pulses having very short rise and fall times, of the order of nanoseconds. Because the capacitance $C1$ in the embodiment of FIG. 2 is charged through R1 and discharged through Q8, a very high duty cycle results since the duty cycle equals $R1/(r_{cs}=R1)$ (where $r_{cs}$ is the collector saturation resistance for Q8) and $R1>>r_{cs}$. Typically $R1$ is the order of 20,000 ohms and $r_{cs}\cong 100$ ohms, making possible a 98 percent duty cycle as compared to a duty cycle of from 50 to 90 percent in prior devices.

Figure 5A:
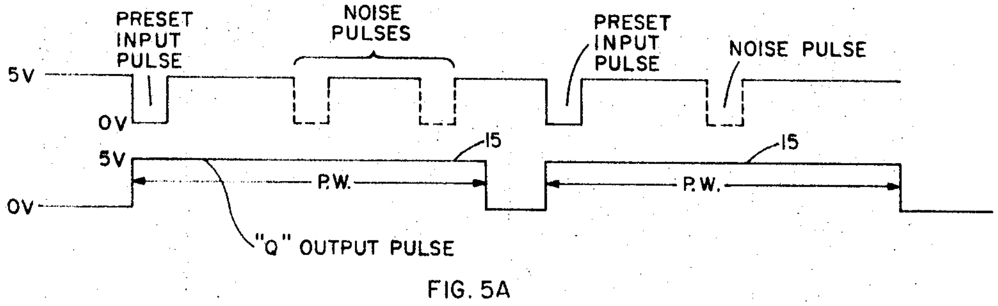
FIG. 5A is a diagram of waveforms of pulses into and out of apparatus of FIG. 2 in a self-locking mode.
Figure 7:
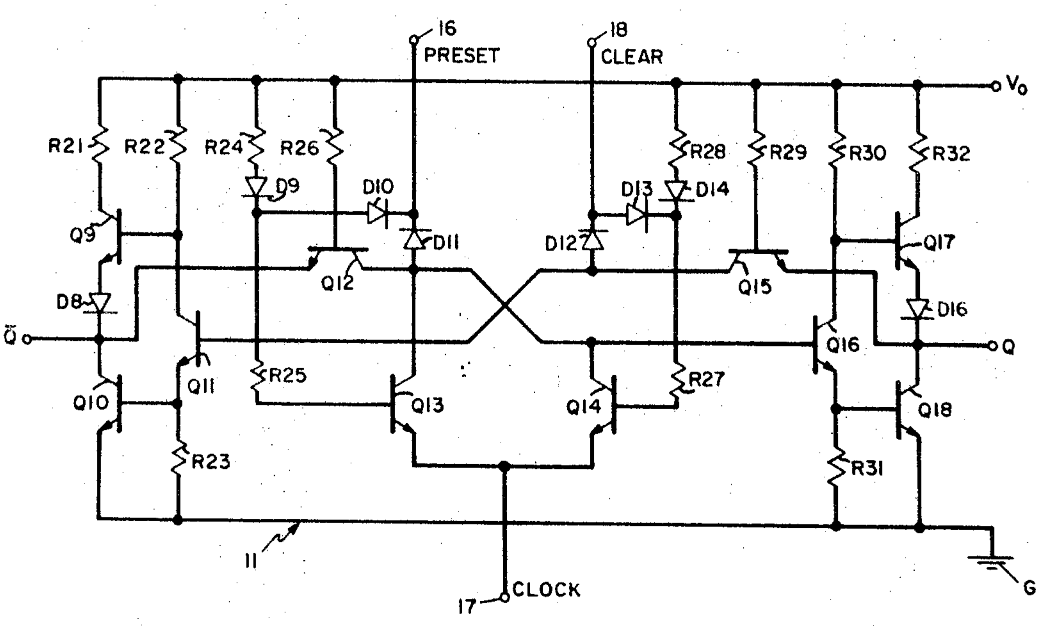
FIG. 7 is a schematic circuit diagram of the flip-flop shown in block diagram form in FIG. 2.

The flip-flop 11 is shown in detail in FIG. 7. The inputs to the flip-flop are a preset input 16, a clock input 17 and a clear input 18, and outputs are Q and $\overline{Q}$, as shown. The preset input is inoperative when the Q output is high (i.e., when a pulse is present at the output terminal 13), and is, therefore, the input used for the self-locking mode which provides noise immunity. Pulse generation in the self-locking mode is illustrated in FIG. 5A, each output pulse 15 being initiated by the falling edge of the preset input pulse and the length p.w. of the output pulses 15 being determined by the relationship ($c$). It is to be observed that the output pulse is not affected by noise pulses intermediate the two preset pulses shown.

Figure 5B:
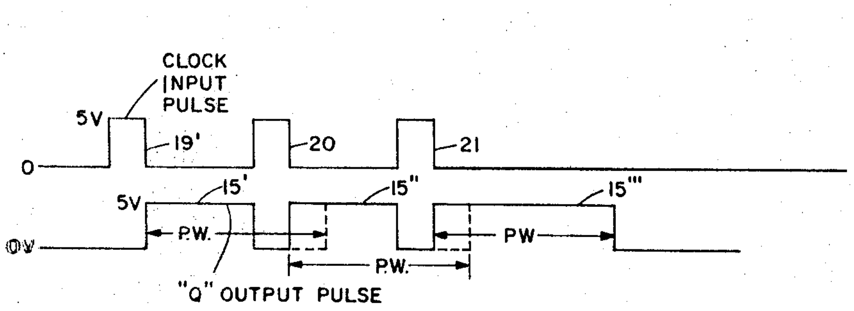
FIG. 5B is a diagram of waveforms of pulses into and out of the apparatus of FIG. 2 in a retriggerable mode.

The clock input provides the pulse outputs illustrated in FIG. 5B (which illustrates the retriggerable mode) where each output pulse is shown to be initiated by the falling edge of the initiating clock pulse. Again p.w. is determined by the relationship ($c$) previously disclosed, but as shown, the rising edge of a clock pulse occurring before the time lapse p.w. will terminate the output pulse. For example, in FIG. 5B the falling edge of a clock pulse 19′ initiates an output pulse 15′ which is terminated by the rising edge of a clock pulse 20; the falling edge of the clock pulse 20 initiates a further output pulse 15″ which is terminated by the rising edge of a clock pulse 21. The retriggerable function of terminating the output pulse is performed by the transistor Q7 which turns on when Q is high and the clock input is also high (a logic AND function being provided by D5 and D6), providing a pulse to the clear input 18.

In addition to elements previously discussed, the flip-flop of FIG. 7 also contains: transistors Q11 and Q16 which serve to drive Q9—Q10 and Q17—Q18, respectively; feedback transistors Q12 and Q15; and coupling transistors Q13 and Q14. The diodes designated D9 to D14 function as coupling diodes, and diodes D8 and D16 are level shifting or biasing diodes for the transistors Q9 and Q17. Resistances R21 and R32 are load resistors for the transistors associated therewith, and resistances R22 to R31 are biasing resistors.

Figure 3:
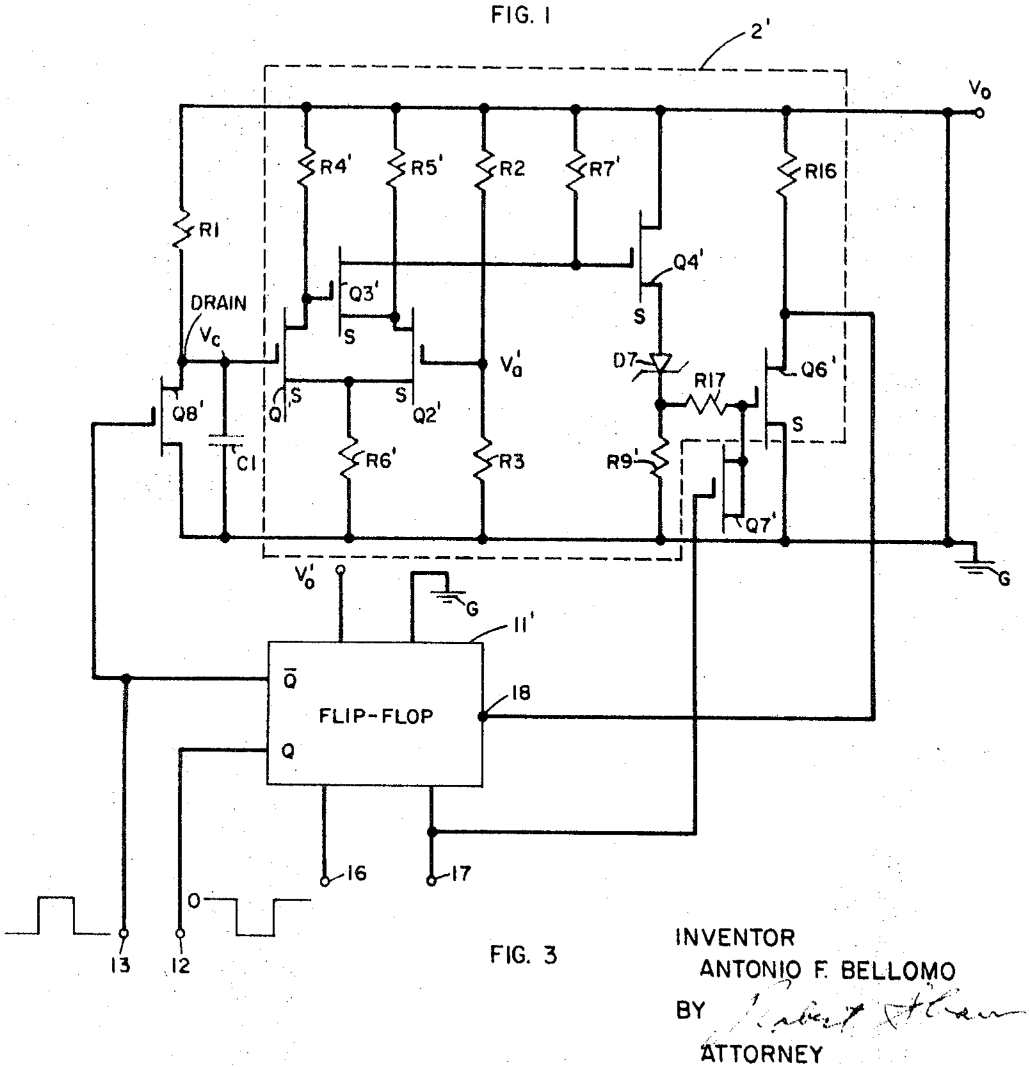
FIG. 3 shows schematically a modification of the apparatus shown in FIG. 2 and illustrates a circuit employing metal oxide field effect transistors.

In FIG. 3 elements that perform identically to the elements in FIG. 2 have the same numbers applied and elements that perform similarly to the elements in FIG. 2 have the same numbers applied but the numbers are primed. Generally, the difference between FIGS. 2 and 3 is that the former illustrates a circuit arrangement for junction transistors and the latter a circuit arrangement for metal oxide field effect transistors (MOSFETS). The differential amplifier 2′ is shown in FIG. 3 comprising input stage field effect transistors Q1′ and Q2′ which again are closely matched over the full temperature range in order to obtain low sensitivity of pulse width to temperature. The drains of the transistors Q1′ and Q2′ are connected to $v_o$ (which in this circuit is a minus voltage rather than plus as in FIGS. 1 and 2) through load resistances R4′ and R5′, respectively, that must have matched temperature coefficients. The resistance designated R6′ is a current setting resistor and functions as a current source to the differential amplifier. A transistor Q3′ is an interstage device, a transistor Q4′ and a diode D7 form a level shifter, and the transistor labeled Q6′ is an output device. A transistor Q7′ is connected as a capacitance to furnish AC coupling of a trigger pulse to the gate of the transistor Q6′ in order to reset the flip-flop 11′ and to trigger the next pulse in the retriggerable mode. Resistances R4′, R5′, R7′ and R16 act as load resistances for the transistors Q1′, Q2′, Q3′, Q4′ and Q7′, respectively, and resistances R9′ and R17 biasing resistors to the gate of the transistor Q7′.

Figure 6A:
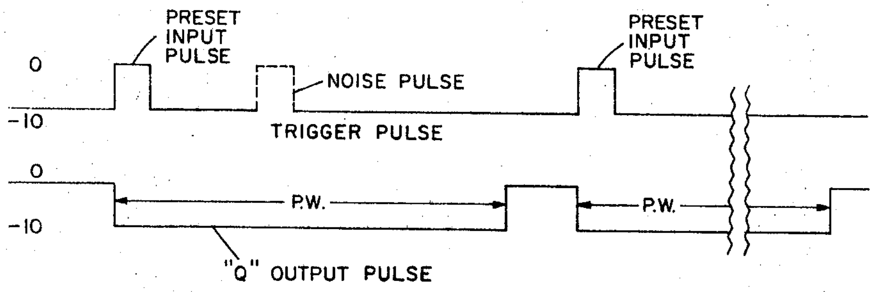
FIG. 6A is a diagram of waveforms of pulses into and out of apparatus of FIG. 3 in a self-locking mode.
Figure 6B:
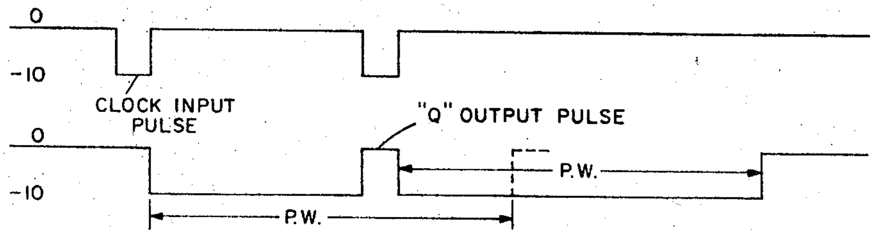
FIG. 6B is a diagram of waveforms of pulses into and out of apparatus of FIG. 3 in a retriggerable mode.

The input-output waveform for self-locking and retriggerable operations of the circuit of FIG. 3 are shown in FIGS. 6A and 6B, respectively. The explanation parallels that given in FIGS. 5A and 5B, respectively, but differs in that the input voltage $v_o$ in the circuit of FIG. 3 is negative, as mentioned, whereas the voltage input $v_o$ to the circuit of FIG. 2 is positive. Thus, in FIG. 6A the "Q" output pulse occurs on the rising edge of the preset input pulse and in FIG. 6B the output pulse is initiated at the rising edge of the clock input pulse. Typical pulses voltage for the pulses in FIGS. 5A and 5B might be between +3 to +5 volts and in FIGS. 6A and 6B between −10 to −15 volts.

Figure 4:
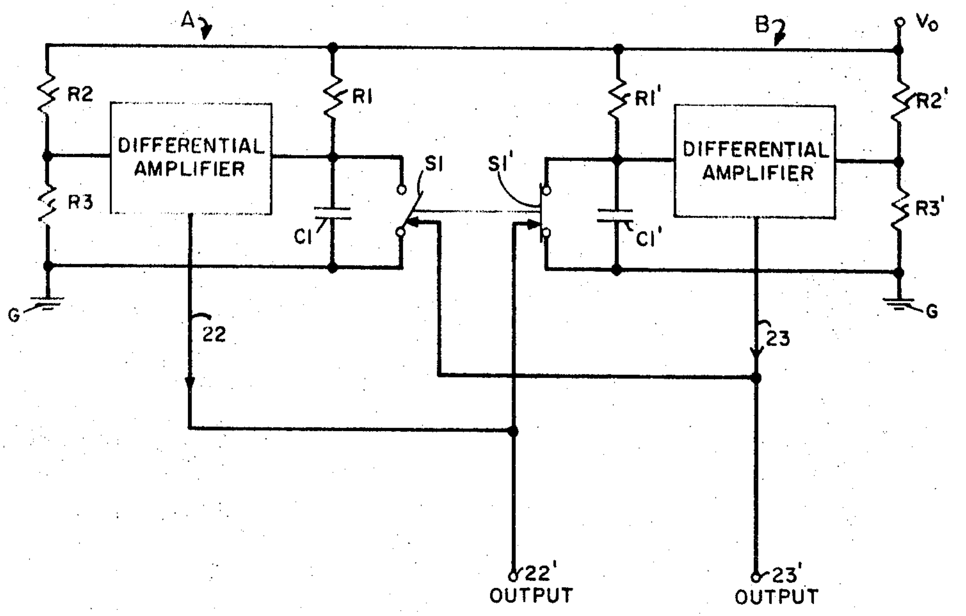
FIG. 4 is a schematic circuit diagram of two monostables similar to the monostable shown in FIG. 1 connected in a closed-loop configuration to form an astable clock generator.

The apparatus shown in FIG. 4 illustrates two monostable multivibrators A and B (each containing the circuit elements shown in FIG. 1) with the exception of S2 in a closed-loop configuration to provide an astable low frequency clock generator. The elements of the monostable B are to those of the monostable A, previously discussed in connection with FIG. 1, and the labels have merely been primed. As shown, the outputs designated 22 and 23 of the multivibrators A and B, respectively, are each fed to the input of the other; thus, the switch S1 in the monostable A opens at the same time as a switch S1′ in the monostable B closes and vice versa. Output from the astable device is derived from terminals 22′ and 23′. The astable multivibrator is particularly useful at frequencies of the order of 100,000 Hz. and below and has frequency stability of the order of a few parts per million per degree centigrade.

As was mentioned previously, monolithic integrated circuitry techniques can be employed to fabricate the circuitry disclosed herein, and to provide the uniformity of temperature necessary to optimize stability it is often necessary to fabricate all or a portion of the elements shown in FIG. 2, for example, on a single chip. In FIG. 1 the resistance R2 can be replaced by the resistance R20 shown dotted between the output of the diode D1 and the input $v$ to the differential amplifier; with this modification the differential amplifier becomes a Schmidt circuit and has improved switching speed at the end of the cycle. The pulse width can be varied in a predetermined exact manner by furnish trimming means in connection with the capacitance $C1$ to allow variation in the range 1μS to 50 seconds; when $C1=0$, the internal stray capacitance limits pulse widths to about 200 nanoseconds minimum. The monostable described has power requirements of 6 to 8 milliwatts which is very low for such devices; it has a ±0.1 percent change in p.w. over the temperature range from −30° C. to 104° C.

Further modification of the invention herein disclosed will occur to persons skilled in the art.

What I claim is:

1. A monostable multivibrator comprising, in combination, a differential amplifier, a capacitance-resistance network connected to one input of the differential amplifier, a voltage divider connected to the other input of the differential amplifier, normally closed switch means connected across the capacitance to bypass the same when the switch is in the closed condition, and normally open switch means adapted to close when the normally closed switch is opened, the normally open switch means being connected to provide an output from the monostable multivibrator.

2. Apparatus as claimed in claim 1 in which the network comprises a resistance and a capacitance serially connected and said one input is connected to the common connection therebetween, and in which the voltage divider comprises two serially connected thermally matched resistances and said other input is connected to the common connection therebetween.

3. A monostable multivibrator as claimed in claim 1 including flip-flop means which acts to control the normally closed switch means and which constitutes the normally open switch means.

4. A monostable multivibrator as claimed in claim 1, including Schmidt trigger means which acts to control the normally closed switch means and which constitutes the normally open switch means.

5. A monostable multivibrator as claimed in claim 1, in which the normally open and normally closed switch means are junction transistors.

6. A monostable multivibrator as claimed in claim 1 in which the transistors are field effect transistors.

7. A monostable multivibrator as claimed in claim 6 in which the transistors are metal oxide field effect transistors.

8. A monolithic integrated circuit monostable multivibrator comprising, in combination, a differential amplifier, a voltage divider connected to the one input of the differential amplifier, the voltage divider comprising thermally matched serially connected resistances, normally closed switch means, normally open switch means adapted to close when the normally closed switch is opened and connected to provide an output from the monostable multivibrator, a flip-flop to control the normally closed switch means, the foregoing elements of the multivibrator being in the form of a monolithic integrated circuit to provide close thermal coupling between said elements; and a time-determining component comprising an external serially connected resistance-capacitance network connected to the other input of the differential amplifier, the normally closed switch means being connected across the capacitance to bypass the same when the switch is in the closed condition.

9. A monostable multivibrator comprising, in combination, a differential amplifier, a capacitance-resistance network connected to one input of the differential amplifier, a voltage divider connected to the other input of the differential amplifier, and switch means connected to short circuit the capacitance of said network in one switch position and to remove the short circuit in the other switch position, the switch means being connected to provide an output from the monostable multivibrator during the period that the short circuit is removed, the network and the voltage divider being adapted to connect in parallel across a voltage source.

10. Apparatus having two monostable multivibrators as claimed in claim 9 in closed-loop configuration to provide an astable low frequency clock generator.